No. 616,942. Patented Jan. 3, 1899.
F. L. & A. KOEHLER.
SPRING WHEEL.
(Application filed Dec. 31, 1897.)
(No Model.) 3 Sheets—Sheet 1.
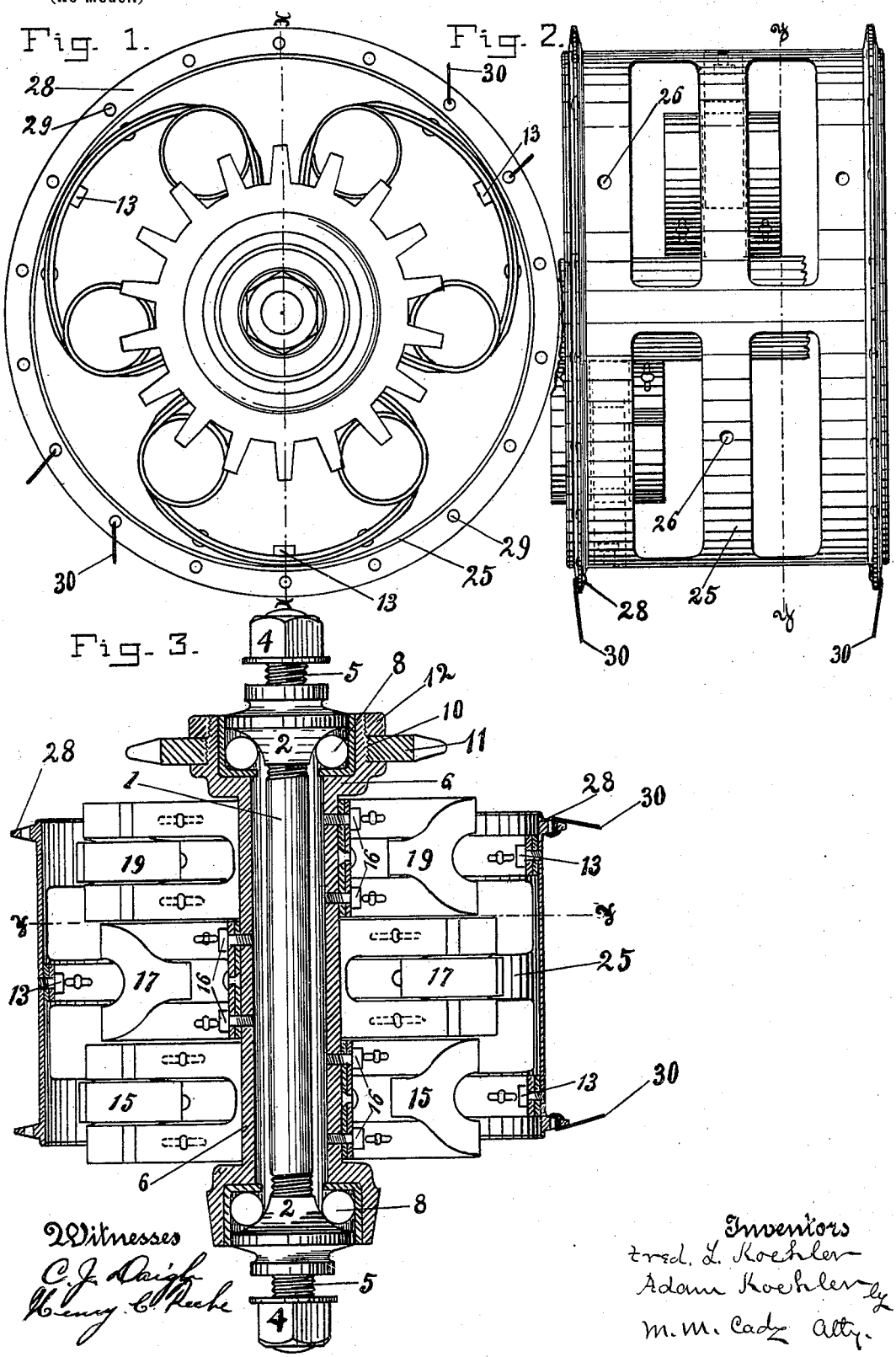

No. 616,942. Patented Jan. 3, 1899.
F. L. & A. KOEHLER.
SPRING WHEEL.
(Application filed Dec. 31, 1897.)
(No Model.) 3 Sheets—Sheet 2.

Witnesses
Inventors
Fred. L. Koehler
Adam Koehler

No. 616,942. Patented Jan. 3, 1899.
F. L. & A. KOEHLER.
SPRING WHEEL.
(Application filed Dec. 31, 1897.)
(No Model.) 3 Sheets—Sheet 3.
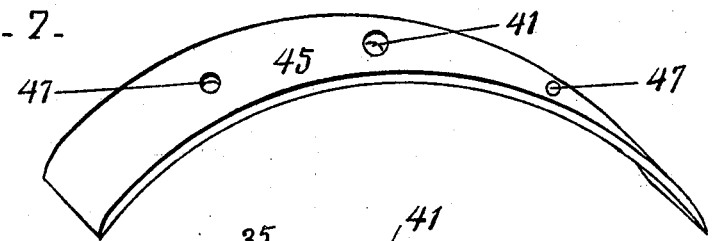
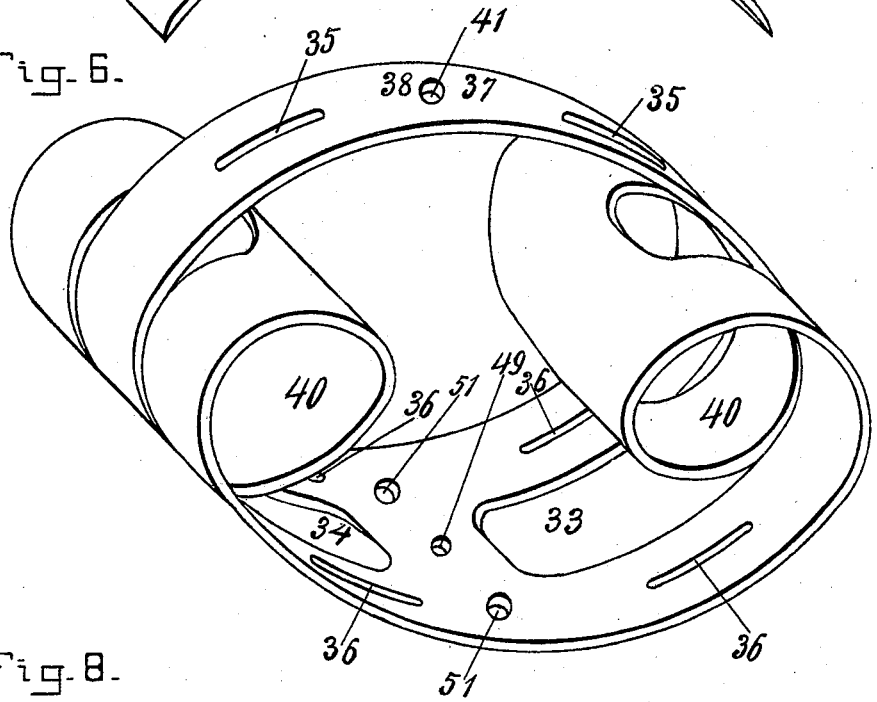
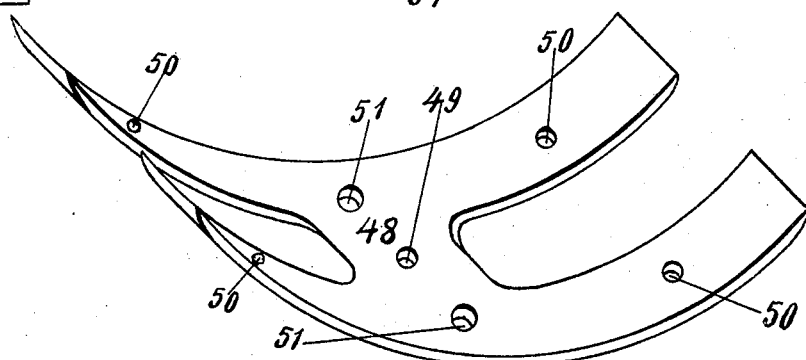
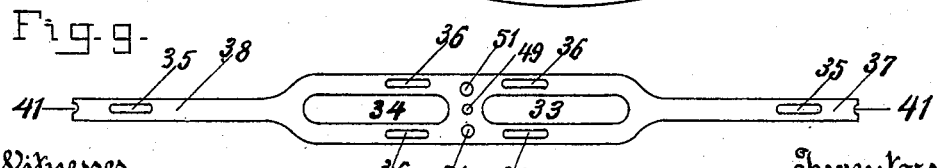
Witnesses
C. J. Daigh
Henry C. Reche
Inventors
Fred L. Koehler
Adam Koehler by
M. M. Cody atty.

UNITED STATES PATENT OFFICE.

FRED L. KOEHLER, OF DUBUQUE, IOWA, AND ADAM KOEHLER, OF CHICAGO, ILLINOIS, ASSIGNORS OF ONE-THIRD TO THOMAS J. DUNNE, OF DUBUQUE, IOWA.

SPRING-WHEEL.

SPECIFICATION forming part of Letters Patent No. 616,942, dated January 3, 1899.

Application filed December 31, 1897. Serial No. 665,231. (No model.)

*To all whom it may concern:*

Be it known that we, FRED. L. KOEHLER, a citizen of the United States, residing in the city and county of Dubuque and State of Iowa, and ADAM KOEHLER, a citizen of the Empire of Germany, residing at Chicago, in the county of Cook and State of Illinois, have invented certain new and useful Improvements in Spring-Wheels; and we do declare the following to be a full, clear, and exact description of the invention, such as will enable others skilled in the art to which it appertains to make and use the same, reference being had to the accompanying drawings, and to the figures of reference marked thereon, which form a part of this specification.

The leading thought of our invention is to provide a bicycle or other wheel with elasticity around its hub, whereby the pneumatic tire may be dispensed with or the strain thereon greatly relieved.

The further benefit will be found in providing such elasticity near the center of the wheel that if it be used with a pneumatic tire the rider can proceed even though such tire be punctured or for any reason is rendered inefficient.

It consists in a series of elliptical springs secured to the hub and to the inside of a cylindrical box surrounding the same to which the spokes of the wheel are attached and also the mode of securing and manner of operating the springs within the box. A full account of the manner of accomplishing this result will be fully set out and described in the following specification when taken in connection with the drawings accompanying the same.

Figure 5:
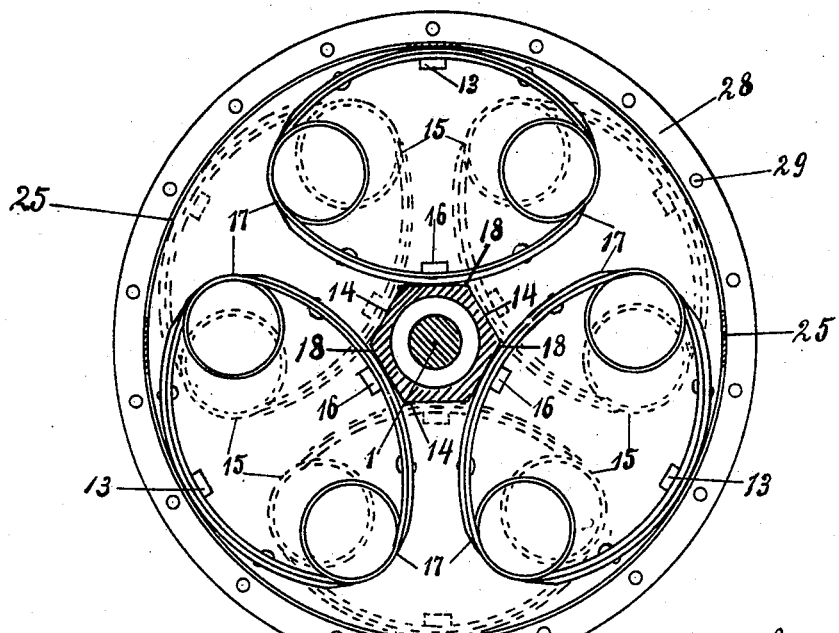
Figure 4:
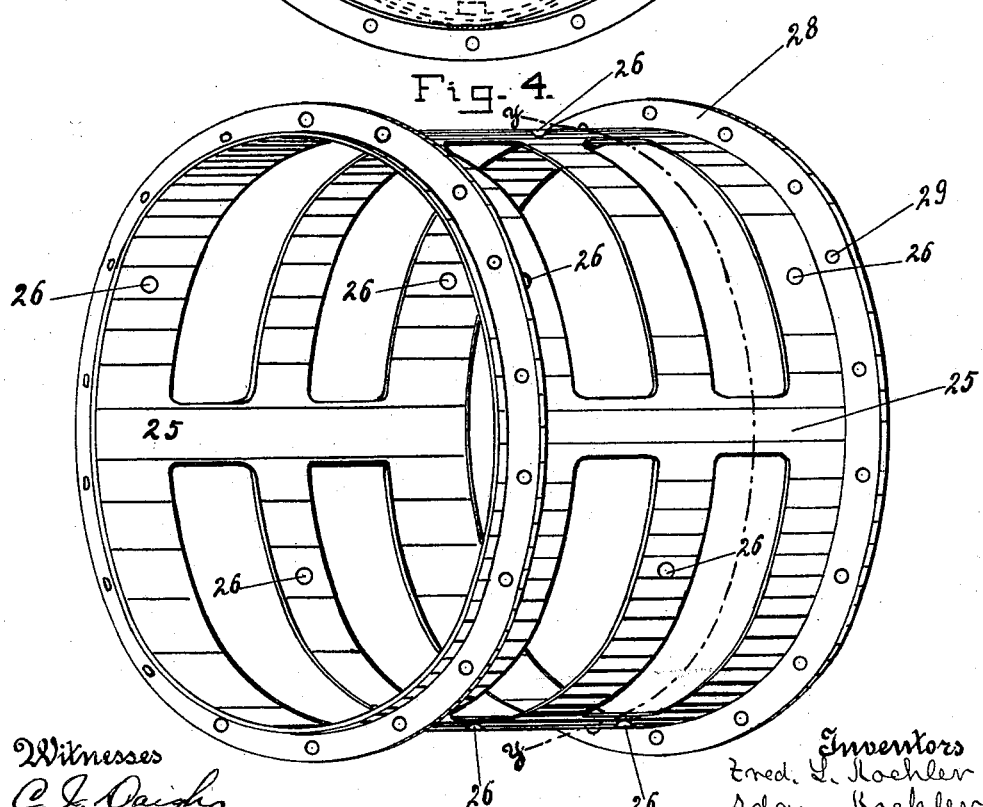

Figure 1 is a side elevation showing the cylindrical box, the three front springs, sprocket-wheel, and hub in position on the axle. Fig. 2 is an end or front view showing part of the hub, one spring of the outer set of springs, and one spring of the middle set. Fig. 3 is a longitudinal section through line $x\ x$, Fig. 1. Fig. 4 is a perspective view of the cylindrical box in which the springs are to be set. Fig. 5 is a cross-section through $y\ y$ of Fig. 2 and of Fig. 4 when said Fig. 4 has the springs and hub therein. Fig. 6 is a perspective view of one of the springs with the supplemental leaves removed. Fig. 7 shows the outer supplemental leaf. Fig. 8 shows the opposite supplemental leaf. Fig. 9 shows a plan view of a spring as cut from a sheet of metal before bending.

Like figures of references denote corresponding parts in all of the drawings.

Referring to the drawings, 1 designates the axle, having the usual cones 2 and nuts 4. Between the nuts and cones, at 5, are attached the forks (not shown) of the bicycle or other vehicle. The axle 1 is surrounded by a hub 6. This hub is preferably of hexagonal shape on its outside, excepting where it encompasses the cones, and there it is circular. It may, however, be of cylindrical shape and flattened on the outside in the places where the springs, hereinafter described, are to be secured. The inside is of cylindrical shape and somewhat larger than the axle, and at each end it is increased in diameter to encompass the ball-bearings 8 and cones 2. One end of the hub 6 is cut away at 10, in which the sprocket-wheel 11 is set and held in position by the lock-nut 12.

To the outer faces of the hub 6 are secured springs 15, 17, and 19 by bolts 16, as shown in Figs. 3 and 5. There are preferably three sets of these springs, consisting of three springs in a set, one set of which springs 15 are secured to three of the hexagonal sides 14 of the hub at or near one end and a similar set 19 secured to the same sides 14, but at or near the opposite end of said hub. Midway between the sets 15 and 19 are secured to the sides 18 of the hub another set of springs 17. It will now be seen that there are two springs on each of the sides 14 and one spring on each of the sides 18 of the hub. All of those springs are also secured to the inner side of a cylindrical box, as shown in Figs. 1, 3, and 5, by bolts 13, passing through the holes 26. The box 25 is surrounded at its outer edges or ends by flanges 28, through which are a number of holes 29, into which holes the spokes 30 of the wheel are secured at one end, as shown in Fig. 1. This cylindrical box is also made in open pattern for the purpose of more readily inspecting and cleaning the hub and springs and to decrease the weight as much as possible.

The springs 15 17 19 (shown in Figs. 6, 7, and 8) are all made substantially alike. The body of the spring of Fig. 6 is first stamped out of a sheet of metal and left in the form shown in Fig. 9, with the open spaces 33 34 and slots 35 and 36. This strip is then formed into a spring by doubling the end 37 through the open space 33 and the end 38 through the space 34, forming the two coils 40, then bringing the two ends 37 and 38 together and uniting them rigidly at 41. The general form of the spring will then be that of an ellipse, with a circular coil 40 at each end. The supplemental spring 45 (shown in Fig. 7) is loosely secured to the mainspring by rivets through holes 47 into the slots 35. The supplemental spring 48 is also rigidly secured to the main body of the spring by a rivet through the holes 49 and loosely secured by rivets through the holes 50 and slots 36. When the spring is completed, it is securely bolted to the hub 6 by bolts 16 through the holes 51 and to the box 25 by bolts through the hole 41. It will be seen that with the springs constructed and set in this manner when the wheel is in motion every spring and each part of all the springs are in operation at the same time, those over the hub stretching out and the coils 40 tightening, the lower springs contracting and their coils expanding, and one coil of the side spring contracting and the other expanding, and each and every part of all the springs at all times operating and constantly changing their manner of operating as the wheel turns, thus giving a uniform and easy action of the spring during the entire turn of the wheel. It will also be observed that if the wheel comes in contact with a stone or other obstruction the rider will be greatly relieved of the jar usually consequent thereto.

It will be further found that when this improvement is used with a wheel having a pnuematic tire if the tire becomes disabled for any cause the rider can proceed without jar or inconvenience.

Having now described our invention, what we claim, and desire to secure by Letters Patent, is—

1. A spring-hub comprising an inner and an outer box, and a number of elliptical springs connecting said boxes by their minor axes, each of said springs being inwardly coiled upon itself at the extremities of the major axis, substantially as set forth.

2. A spring-hub comprising an inner and an outer box, and elliptical springs connecting said boxes at their minor axes, said springs being disposed in sets alternating in position, substantially as set forth.

3. In a spring-hub, an elliptical spring consisting of a middle portion having slots 33 and 34, and narrow portions 38, 38, said middle portion being curved at each extremity into a circle in which the narrow portion projects through its adjacent slot, the remaining middle portion being curved outwardly from said circles, and the narrow portions projecting through said slots being curved in the same direction from the normal, and their ends suitably connected to form an ellipse with said curved remaining middle portion, substantially as set forth.

4. In an elliptical spring substantially as set forth, the curved reinforcing-plate 45 attached to the narrow connecting portion of the spring and the reinforcing-plate 48 attached to the wide connecting portion of the spring, said attaching means being a rivet or the like passing through a hole in one member and a slot in the other member, as and for the purposes described.

In testimony whereof we affix our signatures in presence of two witnesses.

FRED L. KOEHLER.
ADAM KOEHLER.

Witnesses as to Fred L. Koehler:
M. M. CADY,
J. B. LANE.

Witnesses as to Adam Koehler:
JOSEPH SCHLENKER,
WM. MARSH.